Patented Aug. 18, 1925.

1,549,766

UNITED STATES PATENT OFFICE.

FRANK W. HALL, OF PORT ARTHUR, TEXAS, ASSIGNOR TO THE TEXAS COMPANY, OF NEW YORK, N. Y., A CORPORATION OF TEXAS.

PROCESS FOR PRODUCING ALUMINUM CHLORIDE.

No Drawing. Application filed March 1, 1920. Serial No. 362,198.

*To all whom it may concern:*

Be it known that I, FRANK W. HALL, a citizen of the United States, and a resident of Port Arthur, county of Jefferson, and State of Texas, have invented certain new and useful Improvements in Processes for Producing Aluminum Chloride, of which the following is a specification.

This invention relates to the manufacture of anhydrous aluminum chloride by the utilization of alumina, carbon and chlorin and has special reference to provisions for effecting a very intimate contact between the reacting substances.

One object of the invention is to utilize materials that are readily obtainable in oil refineries, hence cheapening the cost of production of aluminum chloride for use in the cracking of hydrocarbon oils.

Aluminum chloride has heretofore been produced by mixing together alumina and soft coal by means of a binder, briquetting and coking the mixture and placing the briquets in a retort and subjecting them to the action of chlorine gas. Such a method is laborious and difficult of commercial operation; the coked product is in more or less of a compact state by reason of the briquetting and hence is difficult to chlorinate, and the carbon and alumina particles lack the intimate contact which is desirable to secure the best results.

The present invention involves an improvement over prior methods in that the step of briquetting is rendered unnecessary, a single material serves the double purpose of binding the mixture to be chlorinated and for furnishing the carbon for the reaction, and a more intimate contact is established between the reacting substances than has heretofore been accomplished.

In practicing my invention I take acid sludge, a well known waste product of oil refineries and mix therewith an aluminum-containing material, which may be an aluminum-containing clay, such as bauxite, or any other suitable aluminum ore. The aluminous material is preferably reduced to a powdered or pulverized condition and it may be heated, if desired, to remove moisture, although in my process either the hydrous or the anhydrous alumina may be used. The acid sludge material, if not a liquid at normal temperatures, is preferably heated to render it so and the powdered alumina is thoroughly mixed with the liquid so that a mixture is formed containing the alumina in suspension thereby producing a very intimate contact between the alumina and carbon. The mixture is then ready to be coked.

Acid sludge is a highly viscous material and it is thus possible to mix it when in a liquid state, with the pulverized alumina so as to form a mixture containing the alumina in suspension. The suspended alumina will not readily settle out, and during the coking operation the boiling of the carbon material prevents the alumina from settling. The mass is in a state of ebullition until near the end of the coking operation when the resultant pitch becomes so thick that the alumina is still retained in suspension. The final coked product consists of a homogeneous mixture of carbon and alumina and is of a porous nature so that it is very susceptible to the subsequent treatment with chlorin.

The coke is heated to reaction temperatures while in an atmosphere of chlorin, the chlorination being carried on effectively by placing the coke in a suitable retort to which chlorin or a chlorin containing gas is admitted. The aluminum chloride passes from the retort in the form of vapors which may be condensed and collected in any suitable manner.

By reason of the intimate contact between the alumina and the carbon the chlorination may be carried on at considerably lower temperatures and with a lower chlorine concentration than has been possible heretofore.

The acid sludge has been found to be one of the best carbon furnishing substances for the alumina-carbon-chlorine reaction. Any acid or water or other vaporizable components that may be present in the sludge material do not injuriously affect the reaction as they are driven off in the form of vapor and gas during the coking treatment, producing an extremely porous coke that yields readily to the chlorination treatment.

The carbon-containing material and the aluminum ore used in the preparation of the mixture for coking are so proportioned that there will be approximately the correct proportion of carbon and alumina in the coke for the reaction with chlorine to form aluminum chloride. The proportions of clay or bauxite and carbon containing material used will vary somewhat from the theoretical proportion of alumina and carbon required due to variations in the purity of the clay or bauxite and due also to variations in the character of the carbon containing substances, as it is desirable to use such proportion of carbon containing material as will not only supply the required amount of carbon but will also serve as a proper binder for the mixture so that a suitable coke will be produced. However, a small excess either of carbon or of alumina will not seriously affect the reaction, and, in fact, an excess of alumina, may at times be desirable, as is pointed out in my copending application, Serial No. 365,861, filed March 15, 1920, which discloses a continuous process for the manufacture of aluminum chloride in which the excess alumina assists in the maintenance of an ash seal in the discharge mechanism of the retort during the chlorination treatment, as is fully described in that application.

In order to acquaint those skilled in the art with the slight variations from the theoretical proportions which may be expected in the practical operation of the process it may be stated that frequently a mixture of 60% acid sludge and 40% clay or bauxite has been coked which yielded an excellent, homogeneous coke of extremely porous character containing 40% carbon and 60% alumina. In these instances there was an excess of alumina in the coke as it was used in the continuous process to which reference has been made.

What I claim is:

1. The process of making aluminum chloride that comprises coking a mixture of bauxite and acid sludge and heating the coked product in the presence of chlorin.

2. The process of making aluminum chloride that comprises heating acid sludge to render it liquid, mixing the liquid with powdered aluminum ore to form a mixture containing the ore in suspension, coking the mixture and chlorinating the product to form aluminum chloride.

3. The process of making aluminum chloride that comprises heating a mixture of aluminous material, and acid sludge to form a porous coke and chlorinating said coke to produce aluminum chloride.

In witness whereof, I have hereunto set my hand this 18th day of February, 1920.

FRANK W. HALL.